United States Patent Office 3,674,406
Patented July 4, 1972

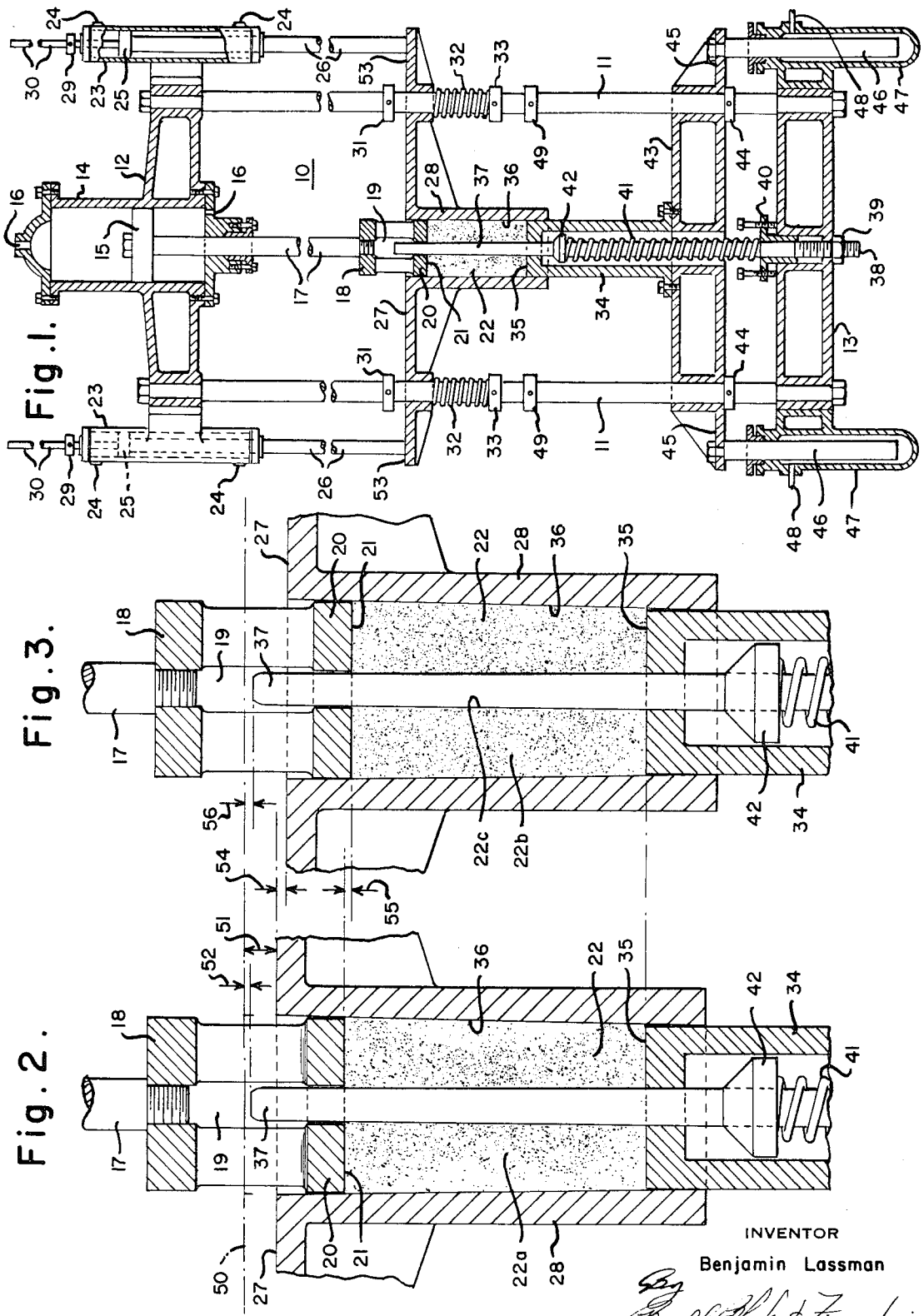

3,674,406
SOLID PRESS MOLDING APPARATUS
Benjamin Lassman, Pittsburgh, Pa., assignor to
Benjamin Lassman & Son, Inc.
Filed Apr. 27, 1970, Ser. No. 31,971
Int. Cl. B28b 3/10
U.S. Cl. 425—353                                1 Claim

ABSTRACT OF THE DISCLOSURE

An improved means for obtaining a uniform densification of compressible particulate material wherein a free-floating tapered mold box and forming head are after application of an initial compression removed as a compressive force in order to release internal pressure of the initially formed article. A second force is applied to said article to obtain final form.

---

My invention relates to an apparatus for molding relatively dry solids which are capable of adhered compaction into a molded shape. My invention is an improvement upon the invention described and claimed in my prior Pat. No. 3,200,465, which in turn was an improvement upon my invention described in Pat. No. 2,209,404.

During the manufacture of refractory molded articles such as bricks it had been observed that articles made by the prior molding practices lacked uniform density. I was able to substantially overcome this lack of uniformity by the apparatus and method set forth in my prior Pat. No. 3,200,465. This invention produced a marked improvement in the uniform densification of molded refractory and ceramic shapes. I was also able to reduce the mold box sidewall wear and the wear on a mandrel core to provide longer periods of trouble-free operation with resulting reduction in equipment and labor costs. I was able to achieve these advantages by employing a free-floating tapered mold box and an independently free-floating core mandrel. While employing the apparatus and methods of my prior inventions, it became apparent that several factors controlling pressure compacting were involved in the obtainment of a uniform density throughout the depth of a ceramic ware. In particular, these factors include the frictional resistance to particulate movement along the mold walls during compaction and the permissible granular particulate motion within the mass on release of compaction force. I have found that the degree of wall friction is dependent upon particulate size, the abrasiveness of the material composition of the charged mass, and the expansion of mold walls under applied compaction forces. In order to compensate for the several factors to obtain an even more uniform densification I provide an improvement upon my prior inventions. In general, I provide for a releasing of the initial compacting forces of the mold head and mold box so that the initially molded article can expand to release internal pressures and allow particulate realignment or orientation within the mass. A second or third compaction molds the article to its final shape.

The advantages of my invention will become apparent from a perusal of the following descriptions taken in connection with the accompanying drawings of which:

FIG. 1 is a front elevation, in partial section, of a press suitable for an operation of this invention;

FIG. 2 is an enlarged view of the mold box area shown in FIG. 1; and

FIG. 3 is a further view of the mold box area including a more uniform densification throughout the mold shape.

Referring to FIG. 1, a molding machine 10 incorporates a plurality of parallel rod standards 11 that are disposed in angular uniformity about the axis thereof. As shown, there are two parallel rods 11 joined together at their top and bottom by yokes 12 and 13, respectively. Yoke 12 supports a central pressing cylinder 14 having double acting piston 15 operable by means of hydraulic fluid through ports 16. A piston rod 17 extends through the lower end of cylinder 14 by a rigid connection to a press head 18. Head 18 is annular and includes central opening 19 extending through a lower end 20. End 20 includes a surface 21 adapted to engage a moldable solids 22. The term annular as herein used includes a circular cross-section as well as a closed curve, polygonal, or combination thereof.

Yoke 12 supports hydraulic mold box cylinders 23 which are double acting and operable by means of hydraulic fluid through their respective ports 24. Associated with each cylinder 23 is piston 25 connected to piston rod 26 which is utilized to depress a mold box table 27 and its associated mold box 28 during appropriate times in the cycling operation. Stop collars 29 are utilized on extensions 30 above cylinders 23 to limit the movement of rods 26. Collars 29 are selectably adjustable for appropriate distance settings selected for a particular operation or set of operations. The lower ends of extensions 30 are affixed to and moved with pistons 25.

Table 27 is movable along rods 11 and is biased by springs 32 towards the underside of stop collars 31 in the rest position plane 50. Collars 31 are affixed in adjusted position on rods 11 as selected by the operation of the device. Stops 33 mounted on rods 11 support the bottoms of the normally compressed springs 32. Mold box 28 has a cross-sectional periphery that is substantially identical to the periphery of end 20 of head 18. The lower end of mold box 28 is closed by plunger 34 having a top closure surface 35. Walls 36 are provided with a slight taper.

I provide a slightly tapered mandrel core 37 which extends through the center of mold box 28. The top of mandrel core 37, in the rest position (plane 50) may extend slightly above the top of table 27 for convenient filling of mold box 28 at the start of the mold operation. Mandrel 37 extends through a slidable opening therefor in the top of a plunger 34 and continues through to yoke 13; the lower end 38 of mandrel 37 is threadably engaged by nut 39 to fix the maximum uppermost position of the top of mandrel 37. An adjustable height fitting 40 is used to support the bottom of a coil spring 41 under compression around mandrel 37 between fitting 40 and collar 42 fixed to the mandrel at a selected height within hollow plunger 34.

Plunger 34 is fixed to platen 43 which is slidably mounted to rods 11 at a predetermined distance above yoke 13 determined by setting of the adjustable stops 44. Lateral brackets 45 of platen 43 are connected to hydraulic means 46 which extend into single acting hydraulic cylinders 47. Hydraulic cylinders 47 are actuated at appropriate times and pressure with hydraulic fluid through ports 48. When cylinders 47 are actuated at the completion of a molding operation, plunger 34 will rise and eject the final molded shape of solid 22b. The upward movement of the plunger 34 is limited by stops 49, which preferably bring top 35, at the completion of the operation, during the ejection of a molding shape, into plane 50.

In the operation of machine 10, piston 15 and head 18 are initially at the top of a stroke, and the top of table 27 is in plane 50 biased against the underside of stops 31 by springs 32. Mold box 28 is empty and the top of core 37 is positioned in plane 50; plunger 34 is in the position shown in the respective figures. Mold box 28 is then filled with solids 22, usually a relatively dry granular refractory or ceramic solid in particulate form. The mold box is filled to the top of table 27 which is in plane 50. Hydraulic fluid is then admitted to upper ports 16 of cylinder 14 at a preselected pressure to force head 18 into contact with the upper annular surface of solids 22 and the top of core 37 enters the lower end of opening 19. The downward movement of head 18 continues until at the preselected pressure it is stopped by the resistance of compacted solids 22 having a molded initial shape 22a, FIG. 2. In the course of the initial molding of shape 22a, head 18 moved a distance below plane 50. At the same time, because of the forces generated in the course of the molding such as side wall friction, table 27 and mold box 28 are moved a distance approximately equal to the distance 51, and core 37 is moved a distance 52 and plunger 34 is not moved at all.

Upon completion of the initial mold shape formation 22a, the hydraulic fluid in cylinder 14 is released so that there is no further compacting force upon head 18. With the compacting force remover, head 18 becomes stationary at the top of shape 22a. Hydraulic fluid is then admitted through upper ports 24 of mold box cylinders 23 to cause the lower ends of rods 26 to engage lateral extensions 53 of table 27. By extension of rods 26 table 27 is depressed and forces mold box 28 down a distance 54. When the mold box 28 is depressed the initially compacted product 22a is released from contact with mold walls 36. The compacted granular mass 22a is freed from mold restraining force and expands to release pressure from within the mass. Hydraulic pressure equal to that of the initial mold shaping force is admitted through ports 16 to cause piston 15 and head 18 to further compact through a distance 55. The second compacting application accomplishes a movement of particles within the granular mass. The second compacting force can be released and the mold box dropped a similar distance as above and a third compacting force applied. I have found, however, that two compacting forces provide sufficient uniformity for the new product 22b and this uniformity is superior to that heretofore formed by the method and apparatus of my previous invention.

The horizontal center cross-section of 22a, because of the mold wall friction, is initially less dense that its upper and lower surfaces. Upon application of the second compacting force this section becomes denser. The intensity of the second compression force is identical to that of the first and is designed to achieve optimum product density. The vertical dimension of the compact will be noticeably decreased by particulate movement between the upper and lower surfaces of initial product 22a. By repeating application of forming pressure, and within the actual permissible limits of particulate movement, there is a grain orientation within the molded mass which allows particle movement under a second pressure application.

With some of the granular materials, following initial compaction, it is advantageous not to release the internal pressure to zero, but to a value intermediate between zero and maximum as determined by test. In such case mold 28 is moved downward until a preselected pressure is reached in cylinders 23 at which time compacting force is reapplied. Under this condition, mass 22a is not fully freed from the mold restraining force; a pressure is retained within the mass to limit particulate orientation prior to applying a second compacting pressure.

Immediately following completion of the molding to final shape 22a the hydraulic fluid is admitted through lower ports 24, raising pistons 25 and rods 26 at least as high as plane 50. The hydraulic fluid at the preselected pressure is directed to the underside of piston 15 which raises head 18 away from table 27. The position of the mold blocks will return under the influence of biasing springs 32 to plant 50.

While I have shown a presently preferred embodiment of my invention it may be otherwise embodied within the scope of the appended claim.

I claim:

1. In a press for molding solids comprising a movable mold box having a tapered inner wall; means for biasing said mold box; an independently movable plunger comprising the bottom of said box; a movable tapered mandrel core extending centrally within and biased toward said mold box; a molding head conforming substantially in shape to the mold box and movable cooperatively thereinto; the improvement therein comprising means sequentially operative to apply force to said head to move it into the mold box to form an initially molded article, to release the compaction force on said head completely to zero after initial formation of the molded article, to reapply a force to said head at least equal to the force initially applied on said head, and then to release the force on said head while withdrawing said head from said mold box; means for slightly moving said mold box against the force of said biasing means to release the initially molded article from constraint of the said mold box in the interim between full release of the initial compaction force on said head and the reapplication of compaction force thereon; and means for elevating said plunger to raise the final molded product from the mold box.

References Cited

UNITED STATES PATENTS

| | | | |
|---|---|---|---|
| 3,200,465 | 8/1965 | Lassman | 25—27 |
| 2,152,569 | 3/1939 | Root | 25—45 |
| 3,050,809 | 8/1962 | Kupka | 25—91 |
| 3,225,411 | 12/1965 | Rybicki | 25—91 |

J. SPENCER OVERHOLSER, Primary Examiner

J. S. BROWN, Assistant Examiner

U.S. Cl. X.R.

425—422, 419